United States Patent [19]
Horiuchi et al.

[11] Patent Number: 5,726,789
[45] Date of Patent: Mar. 10, 1998

[54] METHOD AND DEVICE FOR MODULATING OPTICAL SHORT PULSES

[75] Inventors: Yukio Horiuchi, Niza; Masatoshi Suzuki, Hiki-gun, both of Japan

[73] Assignee: Kokusai Denshin Denwa Kabushiki Kaisha, Tokyo, Japan

[21] Appl. No.: 617,614

[22] Filed: Mar. 19, 1996

[30] Foreign Application Priority Data

Mar. 20, 1995 [JP] Japan ................... 7-085952

[51] Int. Cl.⁶ .................................. H04B 10/04
[52] U.S. Cl. ............... 359/184; 359/161; 359/158; 359/187
[58] Field of Search ................. 359/158, 161–162, 359/181, 184, 187; 375/240, 358

[56] References Cited

U.S. PATENT DOCUMENTS 5,099,471  3/1992  Tsukada et al. .................. 359/184
5,513,030  4/1996  Epworth .......................... 359/162
5,574,588  11/1996  Kawanishi et al. ............... 359/158

*Primary Examiner*—Kinfe-Michael Negash
*Attorney, Agent, or Firm*—Pollock, Vande Sande & Priddy

[57] ABSTRACT

A device for modulating optical short pulses, while preventing a pulse compression optical fiber from degradation of the transmission characteristics even if the length of the pulse compression optical fiber varies, utilizes an optical short pulse generator 1, a pulse compression optical fiber 2, an optical divider 3, a photodetector 6, an amplifier 7, a band pass filter 8, a phase comparator 9, a loop filter 11, and a driving signal generator 12. The loop which comprises loop filter 11 and driving signal generator 12 controls an oscillation frequency in a VCO 12-1 so that the phase of a compressed optical pulse fed to an optical intensity modulator 4 is identical to the phase of a data signal that is synchronized with a reference clock and used to modulate the compressed optical pulse. In this manner, the extinction ratio of the modulation output is not degraded even if the length of the pulse compression optical fiber 2 varies due to ambient temperature variations.

4 Claims, 9 Drawing Sheets

INTEGRATED MODULE(1)

INTEGRATED MODULE(2)

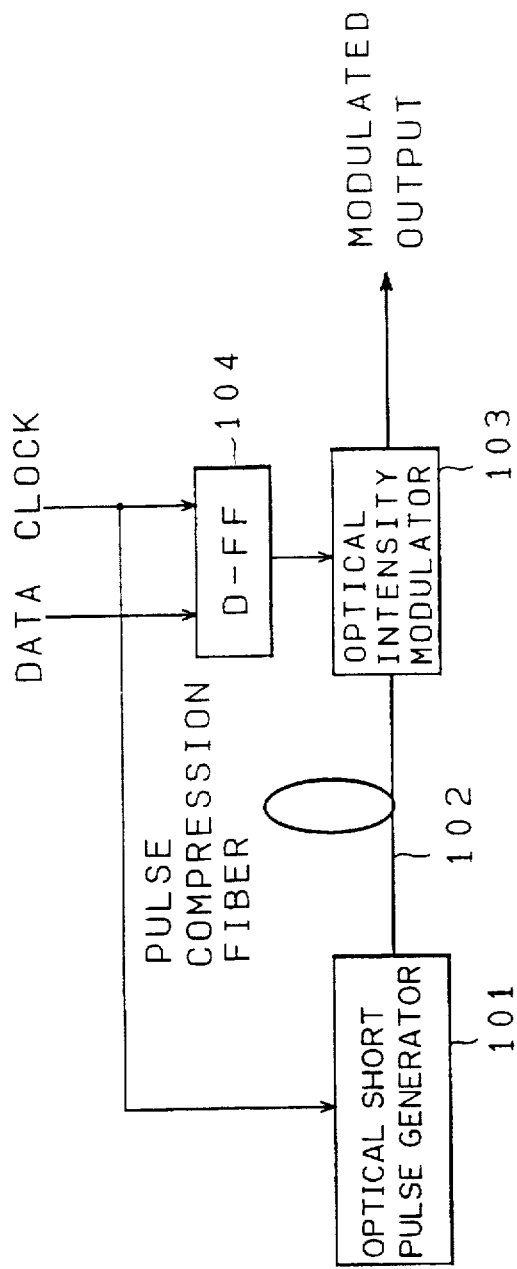
*FIG.4 (a) PRIOR ART*
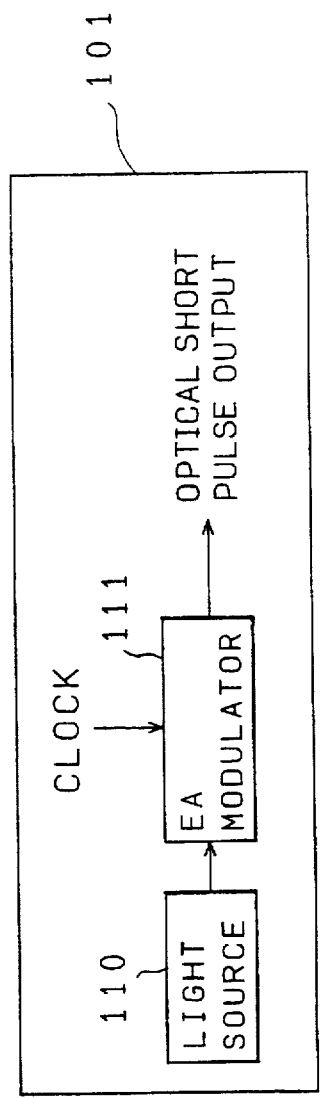
*FIG.4 (b) PRIOR ART*

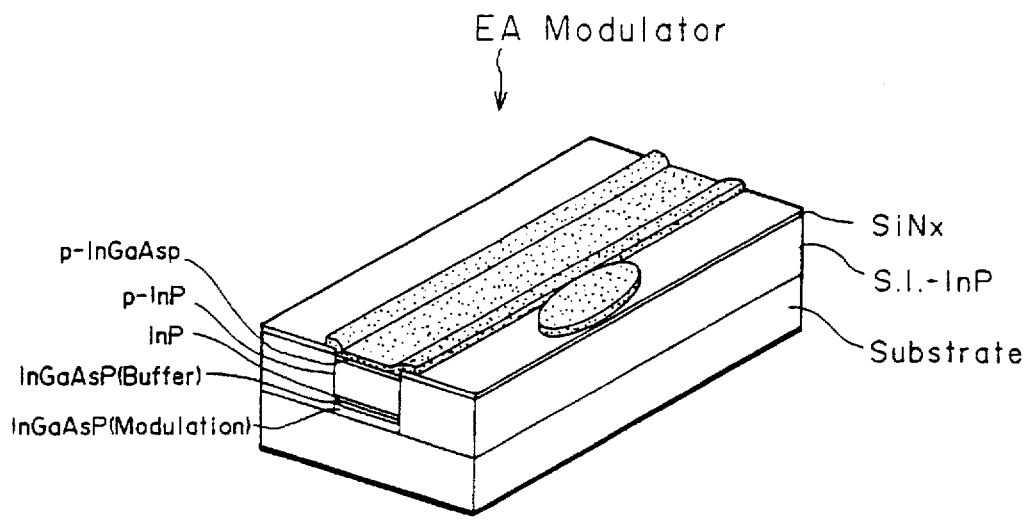
FIG.5 (a) PRIOR ART
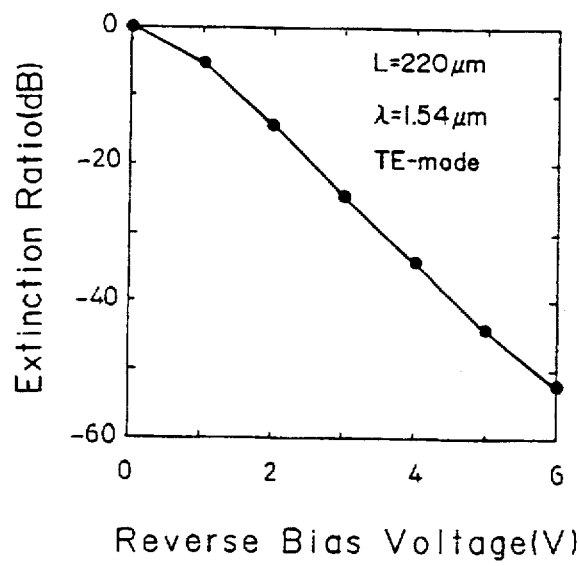
FIG.5 (b) PRIOR ART

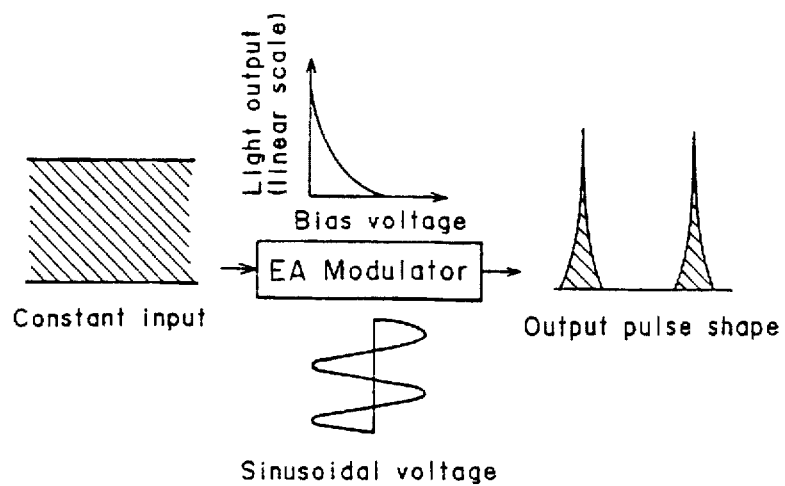
FIG.6 (a) PRIOR ART
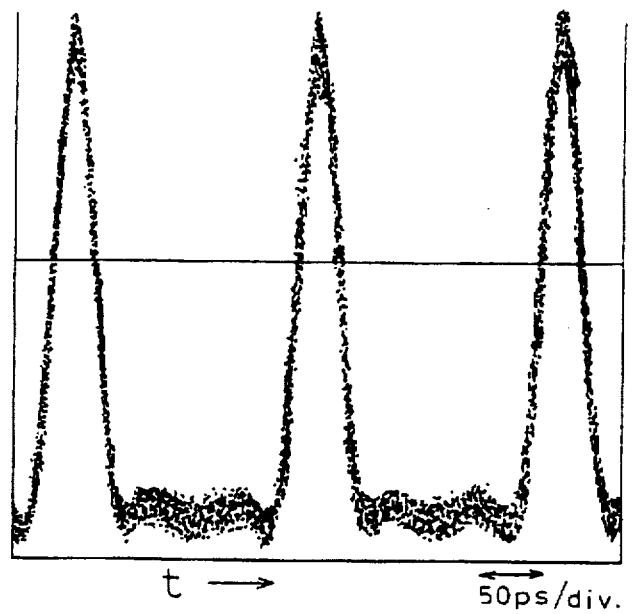
FIG.6 (b) PRIOR ART

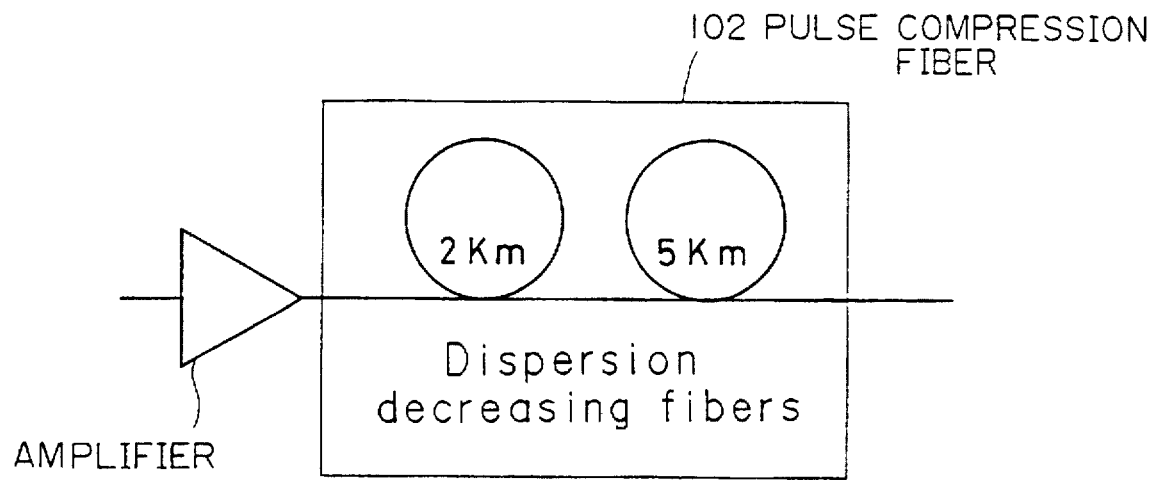
FIG.7 (a) PRIOR ART
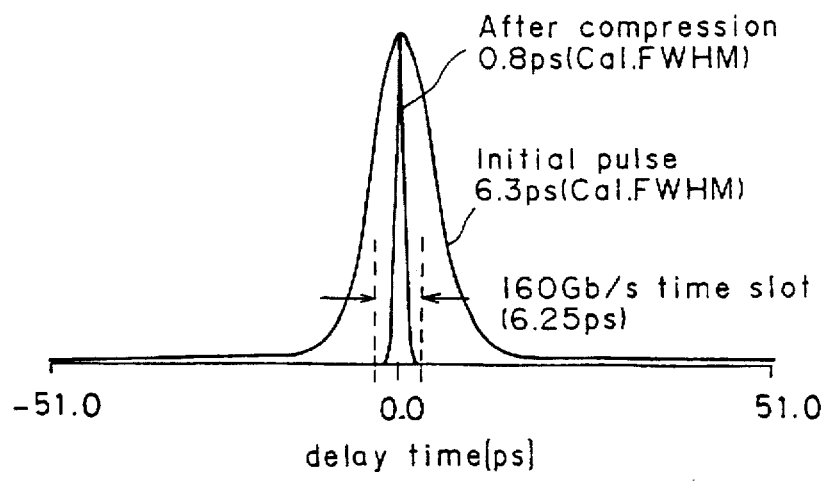
SELF CORRELATION
FIG.7 (b) PRIOR ART

FIG. 8 (a) fm > 2f
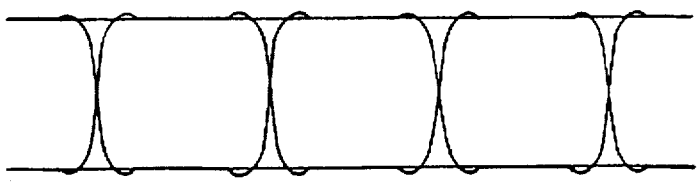
FIG. 8 (b) fm = f
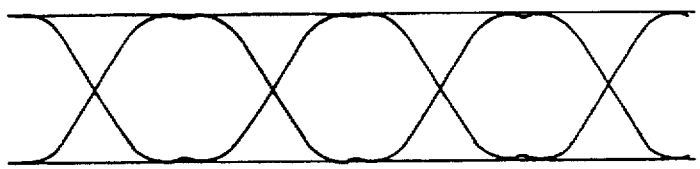
FIG. 8 (c) fm = 0.75 f
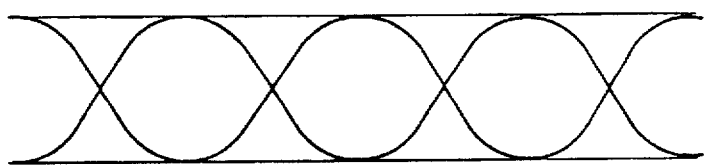
MODULATOR OPTICAL INPUT
FIG. 9 (a)
MODULATOR TRANSMISSION FACTOR
FIG. 9 (b)
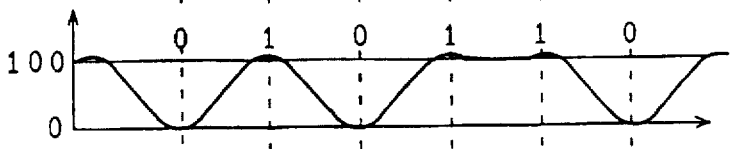
MODULATOR OPTICAL OUTPUT
FIG. 9 (c)
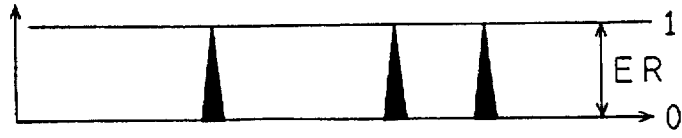

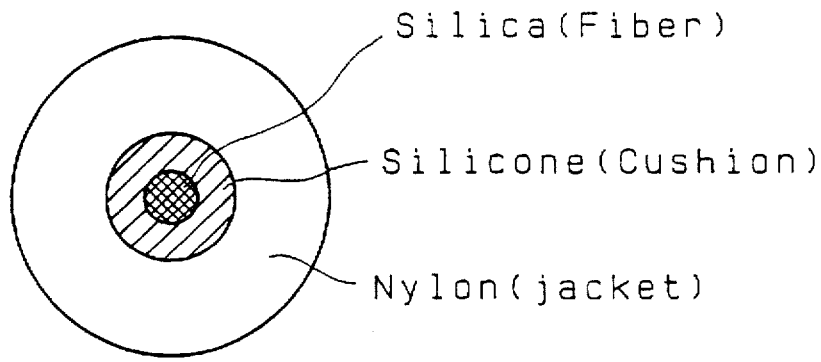
FIG.10 (a) PRIOR ART
Table1. Structural Parameters of the Test Fibers
| Fiber | Diameter (mm) silica (fiber) | silicone (cushion) | Nylon (jacket) | Length (km) | Coefficient of linear expansion ($\times 10^{-6}$/degree) |
|---|---|---|---|---|---|
| 1 | 0.15 | 0.35 | - | 1.57 | 0.5 |
| 2 | 0.125 | 0.30 | 0.7 | 0.59 | 18.4 |
| 3 | 0.15 | 0.30 | 0.9 | 1.55 | 21.9 |
| 4 | 0.15 | 0.45 | - | 0.71 | 0.5 |
| 5 | 0.15 | 0.50 | 0.8 | 0.72 | 23.3 |
| 6 | 0.15 | 0.50 | 0.9 | 0.76 | 30.3 |
FIG.10 (b) PRIOR ART

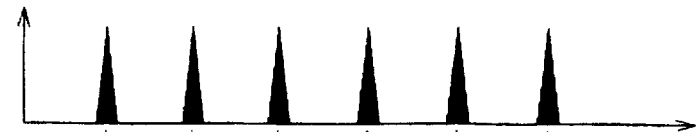
FIG.11 (a) MODULATOR OPTICAL INPUT
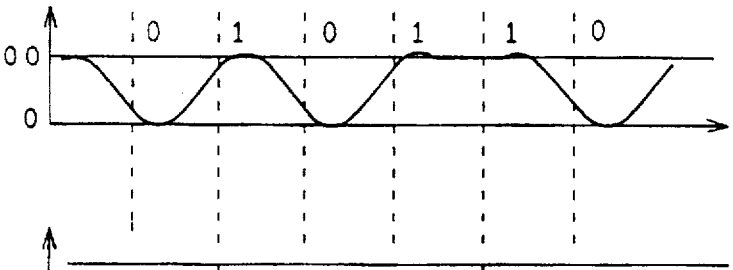
FIG.11 (b) MODULATOR TRANSMISSION FACTOR
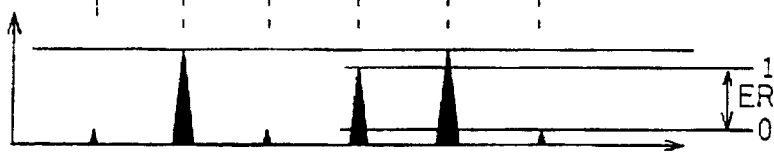
FIG.11 (c) MODULATOR OPTICAL OUTPUT
FIG.12 (a) MODULATOR OPTICAL INPUT
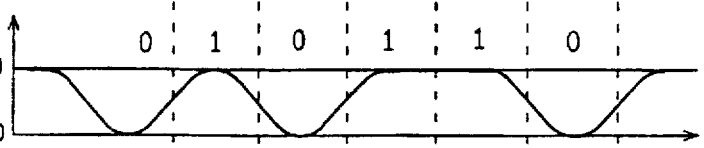
FIG.12 (b) MODULATOR TRANSMISSION FACTOR
FIG.12 (c) MODULATOR OPTICAL OUTPUT

METHOD AND DEVICE FOR MODULATING OPTICAL SHORT PULSES

BACKGROUND OF THE INVENTION

The present invention relates to a method of modulating optical short pulses and a device therefor, providing excellent transmission characteristics.

DESCRIPTION OF THE PRIOR ART

FIG. 4 (a) is a block diagram showing the configuration of a conventional intensity modulator for optical short pulses.

As shown in this figure, an optical pulse generator 101 generates optical short pulses synchronized with a reference clock and outputs them to a pulse compression optical fiber 102. Due to the characteristics of the pulse compression optical fiber 102, the pulse width of the optical short pulses is further compressed and supplied to an optical intensity modulator 103. The optical intensity modulator 103 subjects these further compressed optical short pulses to intensity modulation in accordance with data which is synchronized with the reference clock, and outputs the modulated output.

The reference clock is also supplied to the clock input of a delayed flip-flop circuit (D-FF) 104, and a data signal supplied to the data port of the D-FF is re-timed and synchronized with the reference clock, and supplied to the optical intensity modulator 103.

FIG. 4 (b) is an example of the configuration of said optical short pulse generator 101. As shown in this figure, the optical short pulse generator 101 comprises a light source 110 and an absorption type modulator 111 that is connected in series with the light source 110. In this case, the light source 110 comprises a single-wavelength laser diode, for example, which oscillates to output continuous light with constant intensity.

Other than above method, means for generating optical short pulses using mode-locking of a laser, and gain switching of a semiconductor laser are known.

Next, a semiconductor absorption type modulator i.e. an electroabsorption modulator, referred to as an EA modulator hereinafter, will be described. As shown in FIG. 5 (a), the EA modulator comprises a semiconductor wherein light fed to an InGaAsP waveguide is modulated. This modulation is performed by applying a reverse bias voltage between an n-type electrode formed on the substrate and a p-type electrode formed on the p-InGaAsP cap layer. The characteristics of the extinction ratio vs. reverse bias voltage is shown in FIG. 5 (b). As shown in the figure, an extinction ratio of approximately −53 dB is obtained by applying the reverse bias voltage of −6V. As the vertical axis is a logarithmic axis, the output amplitude decreases practically exponentially with respect to a linearly varying reverse bias voltage.

By using the EA modulator having the exponential extinction ratio actively, the constant input can be modulated into an optical pulse. Namely, as shown in FIG. 6 (a), the direct-current (PC) reverse bias voltage (−Vb) is applied to the EA modulator to which the CW input light is input, until satisfactory extinction is obtained (state in which no output is produced). When a sinusoidal voltage having a peak-to-peak voltage of approximately double the PC bias voltage (2 Vb) is supplied in addition to the DC bias voltage, for the voltage form −Vb to O V, an output depending on the product of the sinusoidal wave and attenuation characteristics of the EA modulator is produced, while below −Vb output is further extinguished. The output waveform of this, as shown in the figure, becomes a compressed optical pulse having an ascending or descending curve in the manner of a pseudo $sech^2$ function.

In this way, a light output whose waveform is a compressed optical pulse appears only when the reverse bias voltage is around 0 V. The repetition frequency of the optical short pulses is equal to the repetition frequency of the sinusoidal voltage that is supplied as reverse bias voltage.

FIG. 6 (b) shows the output waveform of the embodiment with the EA modulator shown in FIG. 5 (a) activated with the direct-current bias voltage of −5.8 V and the amplitude of sinusoidal voltage of 10 V p-p and 5 GHz. The pulse width of the output optical pulse is approximately 30 picoseconds (ps), and its repetition frequency is 5 GHz. The pulse width is adjustable, by changing the direct-current bias voltage.

By the way, in the case of soliton transmission in which it is desired to provide large capacity transmission over long distances using the RZ (Return to Zero) format, it is said that the required pulse width is one fifth ($\frac{1}{5}$) or less of the transmission pulse period. The transmission pulse period is the pulse period after optical time-division multiplexing (TDM). For instance, when the transmission pulse frequency is 20 Gb/s, the transmission period will be 50 ps, so the required pulse width is 10 ps.

In the case of an EA modulator which can embody a pulse generator of simple configuration, the pulse width that can be generated is generally one seventh ($\frac{1}{7}$) of the clock period when a clock is used as the drive signal. Since the possible pulse width with a 10 GHz clock is approximately 15 ps, the aforementioned pulse width of 10 ps cannot be satisfied. Moreover, in the case of transmission at 160 GHz produced by multiplying the optical short pulses generated with a clock of 10 GHz by 16, the required pulse width will be 1.25 or less, providing much shorter pulse width. For this reason, it is necessary to further compress the pulse width of the optical short pulses.

A known means for compressing optical pulse width is the optical adiabatic compression method of soliton described by Kenichi Suzuki and others, "Transform Limit Pulse Generation Technology With Super-high Speed In Sub pico second" 4–141, in the 1994 Spring Conference of the Electronic Information and Communication Association of Japan. A pulse width is compressed by means of pulse compression optical fibers with this method.

FIG. 7 (a) shows the essentials of the foregoing method. As described in this figure, optical short pulses are fed to dispersion decreasing fibers (described as DDF hereinafter) of 2 km and 5 km, which are components of the pulse compression optical fiber 102, via an amplifier (not always necessary). While propagating through this DDF, the pulse width of the optical short pulses is further compressed.

This is because, when an intensive light is launched into a silica glass which is one of the components of the optical fibers, its refractive index changes, producing a corresponding change in the propagation velocity of the light. This operates to cancel the distribution of light propagation velocity produced by dispersion in the optical fiber, compressing the pulse width of the optical pulse.

For instance, as shown in FIG. 7 (b), when a compressed optical pulse having a pulse width of 6.3 ps, a bandwidth product of 0.53, and an intensity of 430 mW is fed to the pulse compression optical fiber 102, a compressed optical pulse having a pulse width of 0.8 ps and a time bandwidth product of 0.31 is obtained. That is, in a time slot of 160

Gb/s, the bottom of the pulse falls by 20 dB or more, enabling 16 optical short pulse trains to be optically time-division multiplexed without interference.

The pulse width after the compression is adjustable by varying the peak value of the input optical pulse to the DDF.

The optical short pulses whose pulse width has been further compressed in this way can be subjected to intensity modulation, in the optical intensity modulator 103, by a data signal. A Mach-Zehnder modulator with lithium niobate (LiNbO$_3$: LN) or said EA modulator are available as this optical intensity modulator 103.

FIGS. 8(a)–8(c) are eye patterns of the modulator output depending on the bandwidth of the optical intensity modulator 103. FIG. 8(a) is a case when the bandwidth fm is at least twice the modulation signal frequency f, the bandwidth fm in FIG. 8(b) is equivalent to the modulation signal f, and the bandwidth fm in FIG. 8(c) is gained by multiplying the modulation signal frequency by 0.75.

As shown in these figures, as the bandwidth of the optical intensity modulator 103 is increased the eye pattern shows a sharp rise (or decay), which allows excellent optical intensity modulation of optical short pulses of narrow pulse width (high frequency) to be achieved. However, broadening the bandwidth of the optical intensity modulator 103 is uneconomical. Moreover, the benefit of optical time-division multiplexing resides in that a lower response frequency optical intensity modulator 103 can be employed and it is not required to provide an expensive high speed modulator with high technology.

Therefore, an optical intensity modulator 103 having a bandwidth fm gained by multiplying the modulation signal frequency f by approximately 0.75, as shown in FIG. 8(c), is generally used.

FIG. 9(a) shows waveforms of the optical short pulses to be fed to the optical intensity modulator 103; FIG. 9(b) shows the transmission ratio of the optical modulator 103 controlled by a data signal; and FIG. 9(c) shows the optical modulator output (modulation output) from the optical intensity modulator 103.

As shown in these figures, when the data signal is "0" the transmission ratio of the optical intensity modulator 103 is 0%; and no optical short pulse is output. By contrast, when the data signal is "1" the transmission ratio of the optical intensity modulator 103 is 100%; then the optical short pulses entered are output as they are. In the case shown in FIG. 9, the data signal, which is a modulation signal, synchronizes with the optical short pulses to be fed to the optical intensity modulator 103.

In this case, the extinction ration ER is a maximum as shown in this figure.

However, it is known that the length of optical fibers varies due to temperature variations. As shown in an example in FIG. 10(a), general optical fibers have a primary covering (cushion) of silicone and a secondary covering (jacket) of nylon. FIG. 10(b) shows the characteristics of test fibers; the elongation of general optical fibers is also shown. For example, in the case wherein the diameter of a fiber is 0.15 mm, that of the cushion is 0.50 mm, and that of the jacket is 0.9 mm, the elongation will be $30.3 \times 10^{-6} (°C^{-1})$.

As shown in FIG. 7(a), the length of the pulse compression optical fiber 102 is 7 km in total. If temperature varies 10° C., the length of the pulse compression optical fiber 102 varies approximately 2.12 m. The propagation velocity of the optical short pulses within the pulse compression optical fiber 102 to be fed to optical intensity modulator 103 will therefore be changed. When this happens, as will be described, the modulation timing in the optical intensity modulator 103 will no longer match that of the optical short pulse train.

FIGS. 11(a)–11(c) show the case when the temperature has fallen, shortening the pulse compression optical fiber 102. In this case, the propagation delay time is shortened by an extent corresponding to the amount of contraction of optical fiber 102 so that the optical short pulses reach the optical intensity modulator 103 earlier as shown in FIG. 11(a). Namely, the optical short pulses have leading phase relative to the data signal and have leading phase in respect of the transmission ratio of the optical intensity modulator 103, as shown in FIG. 11(b).

Consequently, the optical short pulses are input before the transmission ratio of the optical intensity modulator 103 becomes 0%, and some optical short pulses are slightly output even if the data signal is "0" as shown in FIG. 11(c). In addition, since the optical short pulses are input before the transmission factor becomes 100%, the optical short pulses are output slightly attenuated even if the data signal is "1" as shown in FIG. 11(c).

In this case, the extinction ratio ER becomes less, as shown in the figure, resulting in a drop of the symbol identification rate at the receiving end.

A case when the pulse compression optical fiber 102 is lengthened due to a temperature rise is shown in FIGS. 12(a)–12(c). In this case, the propagation delay time is lengthened by the extent of elongation of optical fiber 102, and the optical short pulses reach the optical intensity modulator 103 later as shown in FIG. 12(a). Accordingly, the compressed optical pulse has a phase delay against the data signal, and thus has a phase delay against the transmission factor of the optical intensity modulator 103 as shown in FIG. 12(b).

Therefore, when the data signal in the optical intensity modulator 103 is "0" as shown in FIG. 12(c), the optical short pulses are input while the transmission ratio is still in the process of changing from 0% to 100%; and optical short pulses that have not been fully attenuated are output therefrom. In addition, when the data signal is "1" as shown in FIG. 12(c), since the optical short pulses are fed during the process wherein the transmission factor is changing from 100% to 0%, an attenuated optical pulse is output.

In particular, in an extreme case like this example, the amplitude of modulation output modulated with a data signal of "0" and that of "1" become almost the same and it becomes unable to identify the symbols.

As described above, the conventional modulator for optical short pulses has a problem, degrading transmission characteristics due to degradation of extinction ratio or timing lag between code signals and the optical short pulses depending on the variation of the environmental temperature.

The object of the present invention is to provide a modulating method and a modulator for the optical short pulses which retain excellent transmission characteristics even if the temperature varies.

SUMMARY OF THE INVENTION

To achieve said object, a modulating method for the optical short pulses comprises performing optical intensity-modulation; dividing into separate streams compressed optical pulses which have been compressed by a means for compressing pulses; extracting a repetition frequency signal from one stream of the divided compressed optical pulses; detecting the phase difference between the extracted repetition frequency signal and a reference clock synchronized with the data signal used to perform said optical intensity-modulation; and controlling the frequency and phase of the compressed optical pulses so that said phase difference becomes zero.

In said modulating method for the compressed optical pulse, the phase of the reference clock is adjustable to a prescribed phase.

A modulator for the optical short pulses of the present invention comprises an optical short pulse generator for generating optical short pulses; means for compressing the pulse width of a compressed optical pulse generated by said optical short pulse generator; an optical divider for dividing or branching the compressed optical short pulses from said pulse compressing means; an optical intensity modulator that effects intensity modulation of one of the streams of optical short pulses branched by said optical divider with data synchronized to a reference clock; means for receiving the other stream of optical short pulses branched by said optical divider and extracting its repetition frequency signal; a phase comparator for comparing the phase of the repetition frequency signal from said optical receiving means with the phase of said reference clock, whereby a phase error signal is output according to the phase difference between them; and means for generating a driving signal to control the phase error signal from said phase comparator to zero, the output being applied to the compressed optical short pulse generator.

In addition, in said optical short pulse generator, the reference clock is supplied to the phase comparator via a phase shifter to shift the phase of the reference clock.

According to the present invention the phase difference, between the divided compressed optical pulses from the means for compressing pulses and the reference clock synchronized with data, are controlled so that their phase difference is zero. Therefore, the phase of the data and that of the compressed optical pulses to be applied to the optical intensity modulator are always coincident, even if the characteristics of the means for compressing pulses varies depending upon the temperature.

Consequently, since the extinction ratio is not degraded depending on a temperature variation, the method and apparatus retain excellent transmission characteristics.

BRIEF DESCRIPTION OF THE DRAWINGS

The present invention will be described in detail below with reference to the accompanying drawings, in which:

FIG. 4, constituting FIGS. 4(a) and 4(b), shows the configuration of a conventional modulator for optical short pulses;

FIG. 5, constituting FIGS. 5(a) and 5(b), shows the configuration of an EA modulator and its extinction ratio characteristics vs. reverse bias voltage;

FIG. 6 constitutes a FIG. 6(a) showing the generation of the optical short pulses by the EA modulator, and a FIG. 6(b) showing the waveforms of the optical short pulses that are generated;

FIG. 7 constitutes a FIG. 7(a) illustrating a construction of a pulse compression optical fiber, and a FIG. 7(b) constituting waveforms depicting how the pulse width is compressed;

FIG. 8, constituting FIGS. 8(a)–8(c), depict eye patterns when the band width of the modulator varies according to the modulation signal frequency;

FIG. 9, constituting FIGS. 9(a)–9(c), illustrates the timing when the optical short pulses to the optical intensity modulator are synchronized with the data signal as a modulation signal;

FIG. 10 constitutes a FIG. 10(a) illustrating a construction of an optical fiber, and a FIG. 10(b) table showing its characteristics.

FIG. 11, constituting FIGS. 11(a)–11(c), illustrates the timing when the optical short pulses to the optical intensity modulator have leading phase and are not synchronized with the data signal as a modulation signal;

FIG. 12, constituting FIGS. 12(a)–12(c), illustrates the timing when the optical short pulses to the optical intensity modulator have phase delay and are not synchronized with the data signal as a modulation signal.

DESCRIPTION OF THE PREFERRED EMBODIMENTS

This invention will be described in further detail by reference to the following embodiments of the invention as compared with the prior art shown in the accompanying drawings.

Figure 1:
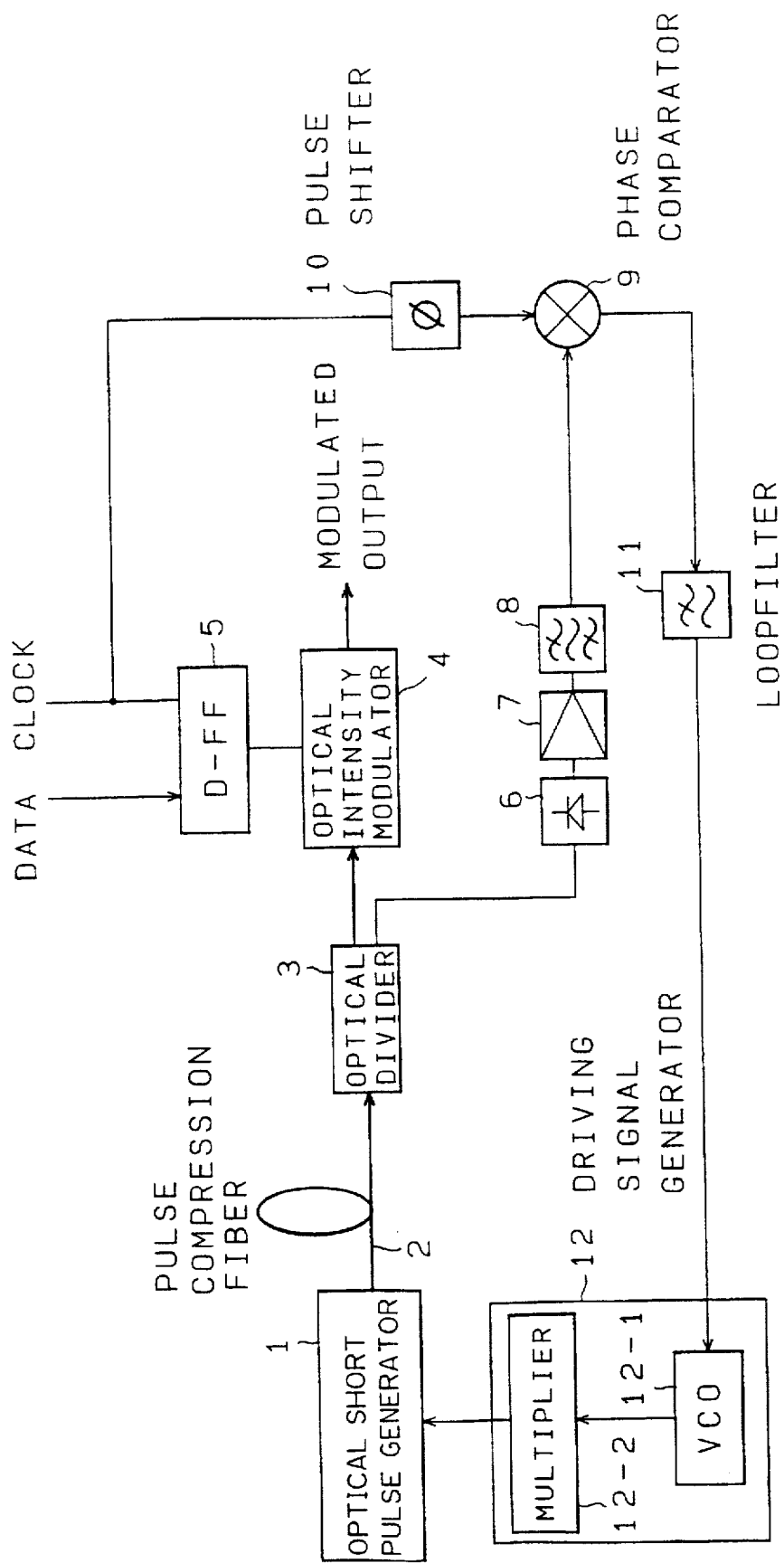
FIG. 1 is a block diagram shown in the configuration of an embodiment of a modulator for optical short pulses of the present invention.

FIG. 1 is a block diagram showing the configuration of a first embodiment of a modulating method for optical short pulses of the present invention.

In this figure, an optical short pulse generator 1 generates optical short pulses which are synchronized with a driving signal fed from a driving signal generator 12. The optical short pulses are then output to a pulse compression optical fiber 2 wherein the pulse of the optical short pulses are further compressed due to the fiber characteristics, and fed therefrom to an optical divider 3. The optical divider 3 branches the incoming compressed optical pulse stream into two; one of the branched pulse streams is fed to an optical intensity modulator 4, and the other branched pulse stream is fed to a photodetector 6. The optical intensity modulator 4 modulates the further compressed optical short pulses by a data signal which is synchronized with a reference clock and outputs the modulated output.

The reference clock is also supplied to the clock input port in a delayed flip-flop (D-FF) 5, whereby the data signal fed to the data port is re-timed before being supplied to the optical intensity modulator 4.

The compressed optical pulses are converted to an electrical signal by the photodetector 6 and is fed to an amplifier 7. The electrical signal converted from the compressed optical short pulses is amplified by the amplifier 7 and is fed to a band pass filter (BPF) 8 to extract their repetition frequency component. The frequency signal of the repetition frequency component of the optical short pulses is fed to one of the input ports of a phase comparator 9.

The reference clock is branched and supplied to a phase shifter 10, and is then fed to the other input port of the phase comparator 9 after having being shifted in phase by a prescribed amount. The phase comparator 9 outputs a phase difference signal to a loop filter 11 depending on the phase difference between the two incoming signals. The loop filter 11 extracts only the low-band component of the phase difference signal and supplies an error voltage to the driving signal generator block 12.

The driving signal generator block 12 comprises a voltage-controlled oscillator (VCO) 12-1 and a multiplier 12-2. The oscillation signal from the VCO 12-1 is controlled by the error signal that is supplied. The oscillation signal from the VCO 12-1 is multiplied an integral number of times by the multiplier 12-2 and is fed to the optical short pulse generator 1 as the driving signal.

The optical short pulse generator 1 comprises a light source 110 and a cascaded electroabsorption modulator 111 as shown in FIG. 4(b), further, the light source 110 comprises a single-wavelength semiconductor laser that generates a continuous beam output. The electroabsorption modulator comprises an EA modulator, or a modulator using a mode-locking laser or gain switch type of semiconductor laser as shown FIG. 5.

In addition, the pulse compression optical fiber 2 comprises a dispersion decreasing fiber (DDF) as shown in FIG. 7, however, it may comprise a combination of a dispersion shifted fiber (DSF) and a DDF.

Moreover, a LN Mach-Zehnder modulator or an EA modulator as described above is used as the optical intensity modulator 4.

D-FF 5 reshapes the waveform of the data signal to synchronize it with the reference clock. Unless jitter exists in the phase between the data signal and the reference clock, or the waveform of the data signal is distorted, it may be eliminated. Since the phase shifter 10 adjusts the timing between the compressed optical pulse train and the modulation, the phase shifter 10 may be located between the BPF 8 and the phase comparator 9 instead of the location shown in the figure.

Since the multiplier 12-2 within the driving signal generator block 12 is used to obtain a higher frequency signal, it may be eliminated when the VCO 12-1 can directly oscillate at the required frequency.

The operation of the modulator for the compressed optical pulses shown in FIG. 1 operates in the following manner:

As described previously by reference to FIG. 6, the optical short pulse generator 1 generates optical short pulses having the same repetition frequency as that of the driving signal supplied from the driving signal generator 12, and feeds them to the pulse compression optical fiber 2. The optical short pulses which are further compressed by the pulse compression optical fiber 2 are branched into two streams by the optical divider 3. One of the streams is intensity-modulated by the optical intensity modulator 4 with the data signal, and is output. The modulation output is subjected to optical time division multiplexing by being optically combined with other modulated outputs which have been phased shifted before being transmitted.

The other stream of compressed optical short pulses divided by said optical divider 3 is converted to an electrical signal by the photodetector 6, and supplied to the BPF 8 via amplifier 7 to extract a repetition frequency component of the optical short pulses. By this means, the BPF 8 outputs a repetition frequency signal of the driving signal which is output from said driving signal generator 12, and phase-shifted mainly by the pulse compression optical fiber 2.

The phase of the repetition frequency component and that of the reference clock are compared by the phase comparator 9, and a phase difference signal depending on the phase difference between them is output. The low-band component of the phase difference signal is extracted by the loop filter (low pass filter) 11, and fed to the VCO 12-1 in the driving signal generator as a phase error signal.

In this way, the oscillation frequency of the VCO 12-1 is controlled to adjust the phase difference detected by the phase comparator 9 to zero. Consequently, since the phase of the compressed optical pulses fed to the optical intensity modulator 4 and that of the data signal output from D-FF 5 are the same, the intensity-modulation is performed in a synchronized condition as shown in FIG. 9, enabling a modulated output to be obtained with maximum extinction ratio ER.

If the pulse compression optical fiber 2 is shortened or lengthened due to a temperature variation, the phase of the frequency signal from the BPF 8 to the phase comparator 9 varies correspondingly. The phase comparator 9 can detect the variation of the length of the pulse compression optical fiber 2. According to the phase difference signal from the phase comparator 9, the oscillation frequency of the VCO 12-1 is controlled. This always allows the phase of the compressed optical pulse to the optical intensity modulator 4 to remain identical to that of the data signal fed from the D-FF 5, even if the length of the pulse compression optical fiber 2 changes. In this way, the modulator for the compressed optical pulse of the present invention is not affected by the length variation of the pulse compression optical fiber 2, and this prevents impairing the state as shown in FIG. 11 or FIG. 12, and allows retaining excellent transmission characteristics.

On initial adjustment, the phase shifter 10 is used to adjust the phase of the reference clock so that it is synchronized with the modulation output from the optical intensity modulator 4 as shown in FIG. 9(c).

However, since the optical fiber from the optical divider 3 to the optical intensity modulator 4 is outside the control loop described above, if its length varies the phase comparator 9 cannot detect the length variation. When the length of the optical fiber between the optical divider 3 and the optical intensity modulator 4 changes, the compressed optical pulse fed to the optical intensity modulator 4 and the supplied data signal have a phase shift, causing the state shown in FIG. 11 or FIG. 12 which impairs transmission characteristics. To prevent this, two optical fibers with the same construction and length may be provided, one being used for connecting the optical divider 3 and optical intensity modulator 4, and the other one being used for connecting the optical divider 3 and the photodetector 6.

Figure 2:
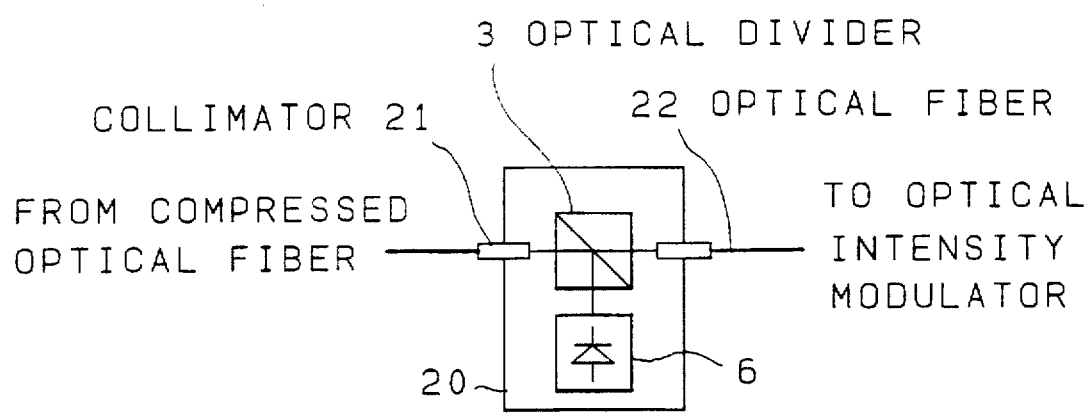
FIG. 2 shows the configuration of a unified module which contains an optical divider and an optical receiver.
Figure 3:
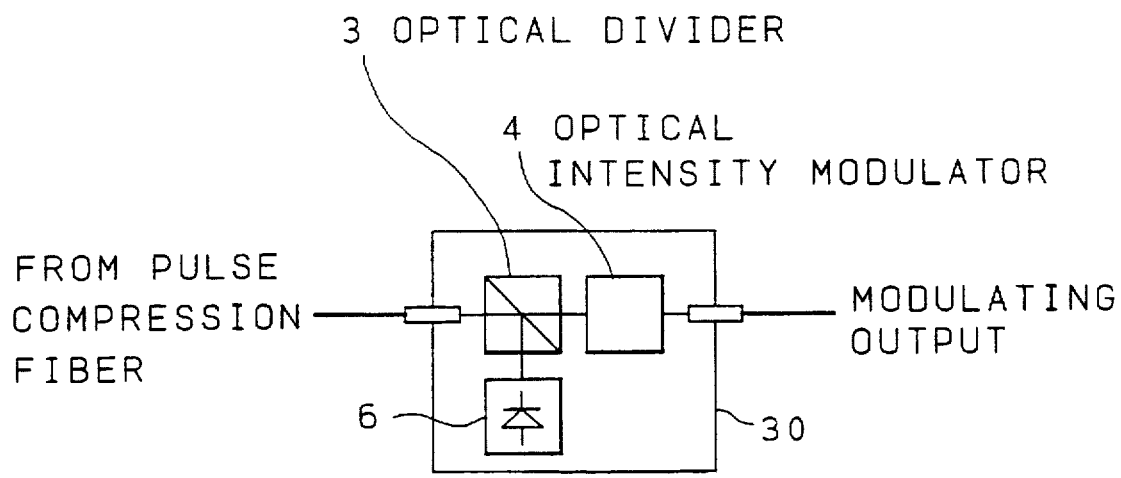
FIG. 3 shows the configuration of a unified module which contains an optical divider, an optical receiver and an optical intensity modulator.

Another way is to make the length of the optical fibers between the optical divider 3 and the optical intensity modulator 4, and between the optical divider 3 and the photodector 6, as short as possible or eliminate them. FIG. 2 and FIG. 3 show the configuration of these embodiments of the invention.

FIG. 2 shows a unified module 20 which contains the optical divider 3 and the photodetector 6. The compressed optical pulse from the pulse compression optical fiber 2 is fed to the unified module 20, collimated by a collimator 21, and then fed to the optical divider 3 within the unified module 20. One of the collimated light beams divided by the optical divider 3 is fed to an optical fiber 22 which is made as short as possible, and then fed to the optical intensity modulator 4. The other of the collimated beams is received by the photodetector 6 within the unified module 20.

FIG. 3 shows an example of an embodiment wherein the unified module 30 contains the optical divider 3, the photodetector 6, and the optical intensity modulator 4. The compressed optical pulses supplied from the pulse compression optical fiber 2 are supplied to the unified module 30, collimated by the collimator, and then applied to the optical divider 3 within the module 30. One of the streams of optical short pulses branched by the optical divider 3 is fed to the optical intensity modulator 4 within the unified module 30. The other parallel light beam is received by the photodetector 6 within the unified module 30.

In the case of the unified module 20 shown in FIG. 2, the optical fiber between the optical divider 3 and the photodetector 6 may be eliminated. Similarly, in the case of the unified module 30 shown in FIG. 3, the optical fibers between the optical divider 3 and the photodetector 6, and between the optical divider 3 and the optical intensity modulator 4, may be eliminated. This eliminates any bad influence due to length variation of the optical fibers. Another means that can be used is to integrate the components by unifying them on a single Si-substrate.

FIG. 2 and FIG. 3 show the modules, excluding the focus lens, etc.

In the present invention configured described above, controlling the phase difference between the compressed optical pulse output from the divided pulse compressing means and the reference clock which is synchronized with the data to zero is possible, so that even if the length of the pulse compressing means varies, the phase of the data and that of the compressed optical pulse applied to the optical intensity modulator are always coincident.

Therefore, the extinction ratio is not degraded even if there is a temperature variation, thereby maintaining excellent transmission characteristics. This allows super-high transmission exceeding 20 Gb/s to be easily achieved.

What we claim is:

1. An optical short pulse modulating device comprising:
    means for generating a drive signal,
    an optical short pulse generating device responsive to said drive signal for generating optical short pulses having a period corresponding to the period of said drive signal;
    pulse compression means for compressing the pulse width of the optical short pulses generated by said optical short pulse generating device;
    an optical divider for dividing into two branches compressed optical short pulses that are output from said pulse compression means;
    an optical intensity modulator, responsive to data synchronized with a reference clock, for intensity modulating one of said branches;
    means for photodetecting the other of said branches to provide a signal representing the repetition frequency of the compressed optical short pulses that are output from said pulse compression means;
    a phase comparator for comparing the phase of said repetition frequency signal with the phase of said reference clock, and outputting a phase error signal corresponding to any phase difference therebetween; and
    means responsive to said phase error signal for controlling the period of said drive signal generated by said means for generating a drive signal in such manner that the phase error signal that is output from said phase comparator is zero.

2. The optical short pulse modulating device of claim 1 wherein said reference clock is supplied to said phase comparator through a phase shifter that adjusts the initial phase of the reference clock.

3. A method of modulating optical short pulses comprising the steps of
    generating a drive signal;
    generating optical short pulses whose pulse width corresponds to the period of said drive signal;
    compressing the pulse width of said optical short pulses;
    dividing said compressed optical short pulses into two branches;
    intensity modulating one of said branches of optical short pulses by data synchronized with a reference clock;
    photodetecting the other of said branches of optical short pulses to obtain a signal representing the repetition frequency of said compressed optical short pulses;
    comparing said repetition frequency signal with said reference clock to generate a phase error signal dependent on the phase difference therebetween; and
    utilizing said phase error signal to control the period of said drive signal in such manner that the phase error signal is reduced to zero.

4. The method of modulating optical short pulses according to claim 3 including the step of initially adjusting the phase of the reference clock so that it is synchronized with said intensity-modulated branch of optical short pulses.

* * * * *